Patented Dec. 28, 1937

2,103,607

UNITED STATES PATENT OFFICE 2,103,607

METHOD OF PREVENTING CATERPILLAR INJURY TO EAR CORN

George W. Barber, New Haven, Conn., dedicated to the free use of the Public

No Drawing. Application September 15, 1936, Serial No. 100,860

1 Claim. (Cl. 47—58)

(Granted under the act of March 3, 1883, as amended April 30, 1928; 370 O. G. 757)

This application is made under the act approved March 3, 1883, as amended by the act of April 30, 1928, and the invention herein described may be manufactured and used by or for the Government for governmental purposes without the payment to me of any royalty thereon.

I hereby dedicate the invention herein described to the free use of the Public, to take effect upon the granting of a patent to me.

This invention consists of a new method of preventing injury to corn ears by the combined used of an ear covering, hereinafter designated "ear cap", and a fumigant.

No practical method has heretofore been known by which corn ears, once infested by caterpillars of the corn ear worm or other species, can be freed of such infestation. No practical method of protecting corn ears from injury by these insects has been known.

The object of the invention described is to provide a practical method whereby undamaged, caterpillar-free, corn ears may be produced at any time notwithstanding the presence of insect enemies in the environment.

The method of protecting corn ears herein described was developed while studying insecticidal control of insects attacking corn. During these studies it was seen that because of habits of the insects and growth habits of the corn plant, it would be extremely unlikely that a practical method of control would be found through application of insecticides to the corn plant in the usual ways in which such materials are generally used.

Because of the way fertilization of corn ears takes place, the ear can not be covered during the first few days after silk is exposed externally. After some four to six days after silk is exposed externally the corn ear can be covered without effect on fertilization or future growth. But during the period when it is being fertilized, and before it is safe to cover the ear, caterpillars of the corn ear worm or other species may enter the ears, so that a protective covering for the ear applied from the fourth to sixth day after silks were exposed externally, is not effective in preventing injury because the caterpillars which will cause injury are, at that time, already within the ear.

It was seen, however, that if a fumigant were to be applied within an ear covering (ear cap) these results would be obtained: (1) the caterpillars or other insects already infesting the ears at the time of application of the ear caps (four to six days after external silks were exposed) would be killed by the penetration of the fumigant among the silks within the ear, (2) further laying of eggs on the external silks by moths would be prevented by the ear cap, (3) migration of caterpillars into the ear would be prevented by the ear cap, or, if they did migrate under the ear cap, they would be killed by the contained fumigant.

Trial in the field of this method resulted in as high as 100 percent caterpillar-free, undamaged corn ears, and the cost of labor and materials, when compared with any other probable control measure seemed to be favorable.

The ear cap may be fashioned of paper or any other suitable material and so formed as to cover the tip of the corn ear tightly, the external silk having been removed from the ear or not. Preferably the ear cap may extend downwards over the ear for about two to three inches below the ear tip, and fit snugly about the ear, holding thereto by its own force so as not to be blown off by wind or otherwise easily dislodged. It may be capable of expansion so as to continuously hold tightly to the ear during the growth of the ear in breadth. It may extend beyond the tip of the ear for one or more inches to allow for growth of external silk. It may be cone shaped or of any other shape desired or found serviceable. The paper or other material used to fashion the ear cap should be little affected by rain, dew, sun or other natural factor, and should be not easily torn, broken, or eaten through by insects.

The fumigant used may be applied in any way, either to the ear cap or to the corn ear itself. While being non-injurious to the growing corn ear, and in no way affecting use of the corn ear as food by man or animals, it should be capable of penetrating into the internal silk of the ear and killing caterpillars or other insects feeding therein. It should continually fill the ear cap with toxic gas from the time when the ear cap is first applied until roasting ear harvest or, in the case of seed corn, until the ear is too ripe to be attractive as food for caterpillars.

As a preferred fumigant, I recommend hexachlorethane.

The greatest efficiency in the practical use of the described method will seemingly be attained if the ear caps are manufactured complete with the fumigant contained therein. The grower of corn will then only be obliged to expend time in control necessary in placing ear caps on his corn ears, which may be done quickly.

Having thus described my invention, what I claim for Letters Patent is:

The method of protecting the ears of growing corn from insect attack, consisting of covering the silk end of the ear of corn with a substance that has been impregnated with a fumigant.

GEO. W. BARBER.